US006929764B2

(12) United States Patent
Jiang et al.

(10) Patent No.: US 6,929,764 B2
(45) Date of Patent: Aug. 16, 2005

(54) POLYMERS HAVING ORDERED, MONODISPERSE PORES AND THEIR CORRESPONDING ORDERED, MONODISPERSE COLLOIDS

(75) Inventors: Peng Jiang, Beijing (CN); Vicki L. Colvin, Houston, TX (US)

(73) Assignee: William Marsh Rice University, Houston, TX (US)

( * ) Notice: Subject to any disclaimer, the term of this patent is extended or adjusted under 35 U.S.C. 154(b) by 69 days.

(21) Appl. No.: 09/992,084

(22) Filed: Nov. 19, 2001

(65) Prior Publication Data

US 2002/0143073 A1 Oct. 3, 2002

Related U.S. Application Data

(60) Provisional application No. 60/252,179, filed on Nov. 21, 2000, and provisional application No. 60/249,781, filed on Nov. 17, 2000.

(51) Int. Cl.[7] .......................... B29C 71/02; C23F 4/04; B29D 11/00; C09K 3/00
(52) U.S. Cl. ....................... 264/42; 264/1.1; 264/1.21; 264/2.5; 264/41; 264/43; 264/48; 264/221; 264/321; 516/100; 521/61; 252/584
(58) Field of Search .................. 516/33, 100; 524/439, 524/440; 106/403; 264/43, 221, 41, 42, 1.1, 1.21, 2.5, 48, 49, 321, 227; 252/584; 521/61

(56) References Cited

U.S. PATENT DOCUMENTS

| | | | | |
|---|---|---|---|---|
| 3,267,041 A | * | 8/1966 | MacCallum | 516/95 |
| 4,784,794 A | * | 11/1988 | Kato | 516/90 |
| 5,147,841 A | * | 9/1992 | Wilcoxon | 516/33 X |
| 5,269,980 A | | 12/1993 | Levendis et al. | 264/9 |
| 5,772,735 A | * | 6/1998 | Sehgal et al. | 501/12 X |

(Continued)

OTHER PUBLICATIONS

P. Jiang et al., *Single–Crystal Colloidal Multilayers of Controlled Thickness*, Chem. Mater. 1999, 11, pp. 2132–2140, month unknown.

J.F. Berton et al., *Thickness Dependence of the Optical Properties of Ordered Silica–Air and Air–Polymer Photonic Crystals*, Physical Review Letters, vol. 83, No. 2, Jul. 12, 1999, pp. 300–303.

P. Jiang et al., *Preparation of Macroporous Metal Films from Colloidal Crystals*, J. Am. Chem. Soc. 1999, 121, 7957–7958, month unknown.

P. Jiang et al., *Template–Directed Preparation of Macroporous Polymers with Oriented and Crystalline Arrays of Voids*, J. Am. Chem. Soc. 1999, 121, 11630–11637, month unknown.

R. Rengarajan et al., *Optical Properties of a Photonic Crystal of Hollow Spherical Shells*, Applied Physics Letters, vol. 77, No. 22, Nov. 27, 2000, pp. 3517–3519.

A. Blanco, et al, *Nature* 405, 2000, 437–440.

A.P. Philipse et al., *Journal of Material Science Letters*, 8, 1989, 1371–1373.

A. Van Blaaderen et al., *Nature*, 385. 1997, 321–324.

K. Busch and J. Sageev, *Physical Review E*, 58, 1998, 3896–3908.

*Primary Examiner*—Daniel S. Metzmaier
(74) *Attorney, Agent, or Firm*—Conley Rose, P.C.

(57) ABSTRACT

Ordered, monodisperse macroporous polymers, their corresponding ordered, monodisperse colloids, and methods of preparing them are disclosed. The methods use an ordered, monodisperse colloidal template to define the polymer pore morphology, which in turn acts as a mold for the growth of a new ordered, monodisperse colloid. The macroporous polymer may be prepared with either spherical or ellipsoidal pores from a wide variety of polymeric systems. The new ordered, monodisperse colloid may be grown from a wide variety of materials including ceramics, semiconductors, metals and polymers. These materials are potentially useful in optical, micro-filtering and drug delivery applications.

22 Claims, 10 Drawing Sheets

U.S. PATENT DOCUMENTS

| | | | |
|---|---|---|---|
| 5,976,444 A | * 11/1999 | Pearson et al. | 264/221 X |
| 6,027,666 A | * 2/2000 | Ozin et al. | 252/584 X |
| 6,054,495 A | * 4/2000 | Markowitz et al. | 516/97 |
| 6,054,507 A | * 4/2000 | Funaki et al. | 524/440 X |
| 6,113,722 A | * 9/2000 | Hoffman et al. | 264/221 X |
| 6,139,626 A | 10/2000 | Norris et al. | 117/68 |
| 6,218,485 B1 | 4/2001 | Muramoto et al. | 526/87 |
| 6,228,340 B1 | 5/2001 | Imhof et al. | 423/338 |
| 6,245,849 B1 | * 6/2001 | Morales et al. | 524/442 |
| 6,261,469 B1 | * 7/2001 | Zakhidov et al. | 216/56 |
| 6,262,129 B1 | * 7/2001 | Murray et al. | 516/33 |
| 6,291,553 B1 | 9/2001 | Harrison et al. | 523/223 |
| 6,517,763 B1 | * 2/2003 | Zakhidov et al. | 264/344 |
| 6,531,304 B1 | * 3/2003 | Bönnemann et al. | 516/33 X |

\* cited by examiner

POLYMERS HAVING ORDERED, MONODISPERSE PORES AND THEIR CORRESPONDING ORDERED, MONODISPERSE COLLOIDS

CROSS-REFERENCE TO RELATED APPLICATIONS

The present application claims the benefit of U.S. provisional applications Ser. No. 60/249,781, filed Nov. 17, 2000, and entitled "New Method to Fabricate Macroporous Polymers with Tunable and Oriented Voids for Filtration and Optical Applications" and Ser. No. 60/252,179, filed Nov. 21, 2000, and entitled "New Method to Fabricate Monodisperse Colloids with Controllable Morphologies and Their Corresponding Artificial Opals," both of which are incorporated herein by reference.

STATEMENT REGARDING FEDERALLY SPONSORED RESEARCH OR DEVELOPMENT

This work was funded in part by National Science Foundation Grant Number 9702520.

TECHNICAL FIELD OF THE INVENTION

The present invention relates generally to polymers having ordered, monodisperse macropores, their corresponding ordered, monodisperse colloids, and methods of making same. More particularly, the present invention relates to polymers synthesized by first polymerizing monomers around an ordered, monodisperse colloidal template and then chemically removing the template to yield a polymer product having ordered, monodisperse and interconnected pores. The present invention further relates to second-generation colloids synthesized by infiltrating various materials into the aforementioned porous polymers, which act as a mold for colloid growth, and then removing the macroporous polymer to yield an ordered, monodisperse colloid.

BACKGROUND OF THE INVENTION

Macroporous Materials

A material whose molecular structure is permeable to fluid or gas flow is porous. These materials are frequently characterized by the size of their pores, which are voids in the material: very small pores having diameters less than 2 nanometers (nm) are called micropores; intermediate size pores having diameters between 2 and 50 nm are called mesopores; and very large pores having diameters greater than 50 nm are called macropores. Conventional porous materials have randomly distributed voids that exhibit neither shape nor size uniformity. In contrast, voids or particles possessing a periodic distribution or lattice are referred to as ordered and those having a narrow size and shape distribution are referred to as monodisperse.

Macroporous materials, those having macropores, have a wide range of applications in chemistry. In particular, macroporous polymers are useful as catalytic surfaces and supports, separation and adsorbent media, biomaterials, chromatographic materials, and thermal, acoustic and electrical insulators. In many of these areas, the utility of the porous system is a sensitive function of the internal pore diameters, their distribution and their morphology. Consequently, many synthetic approaches to creating these materials, both polymeric and inorganic, have focused on creating internal voids with monodisperse and controllable diameters.

Macroporous materials having not only monodisperse voids but also long-range three-dimensional ordering are referred to herein as ordered, monodisperse macroporous materials. Such materials are potentially valuable in optical applications. For example, materials having arrays of ordered, spherical pores whose diameters are about 500 nm act as diffractive optics for visible light. Furthermore, numerous optical applications have been suggested for well-ordered materials having long-range dielectric periodicity. These materials are potentially useful as substrates for planar waveguides; infrared filters; linear and nonlinear optics and chemical sensors; and for the control of spontaneous emission rates. These materials are traditionally formed using electron beam or photolithography techniques. Manufacturing limitations imposed by such processing have generally limited their utility to longer wavelength infrared and microwave applications and/or periodic structures of only two dimensions.

To be useful in optical technologies, an ordered, monodisperse macroporous material must be of high optical quality (no cracks or bubbles), controlled thickness, and uniform over a square centimeter or more. Although numerous methods have been developed for the fabrication of well-ordered macroporous materials—e.g., ion-track etching polymerization, chemically induced phase separation, block copolymer self-assembly, and copolymerization—these methods do not provide the long-range crystalline order and sample format required for optical applications. One promising technique for achieving long-range crystalline order involves the self-assembly of a sacrificial template to define the porous structure. Work in the last few years has demonstrated the utility of self-organizing systems as templates for the growth of a second material. These self-organized systems include surfactants, biological systems, liquid-droplet surfaces, and emulsions. Many of these systems are capable of producing macroporous materials of both polymers and inorganic oxides with pore sizes $\geq 50$ nm. Unfortunately, however, the templates derived from these systems are polycrystalline, and the resulting samples lack the long range order and uniformity necessary for optical applications.

For example, U.S. Pat. No. 6,228,340 ("the '340 patent") teaches the production of ceramics having spherical pores with a controllable pore size and a narrow pore size distribution. The '340 patent discloses the use of aqueous and nonaqueous emulsions as templates around which ceramics are deposited through a sol-gel process. Following the deposition, the emulsion template is removed by drying and heat treatment. Unfortunately, the macroporous ceramics disclosed in the '340 patent undergo significant shrinkage and although the pores show a "high degree of order," there is no mention of the long-range periodicity necessary for optical applications.

U.S. Pat. No. 6,139,626 ("the '626 patent") teaches a method for patterning materials according to a predetermined pattern by infiltrating nanocrystals into a template, sintering the nanocrystals into a monolithic structure, and then removing the template. According to the '626 patent, an appropriate template includes sub-micron spheres which self-assemble into colloidal crystals. The '626 patent also discloses selective chemical etching as a means for removing silica spheres. The '626 patent does not, however, disclose products having the long-range periodicity necessary for optical applications.

Simply put, the quest for ordered, monodisperse macroporous materials suitable for optical applications has proved unsuccessful.

Monodisperse Colloids

Colloids are materials resulting from the aggregation of small particles suspended in solution. Colloids comprised of monodisperse particles potentially offer the benefits of long-range order and periodicity because such colloids can adopt a long-range crystalline lattice. Colloids that have adopted a long-range crystalline form are referred to herein as ordered, monodisperse colloids. Monodisperse colloids possess uniform physical and chemical properties useful for the quantitative evaluation of the optical, magnetic, electrokinetic, or adsorptive behavior of colloidal matter. In addition, highly uniform colloids offer superior properties for commercial applications ranging from magnetic recording to optical pigments. When sedimented, colloids composed of monodisperse particles can form three-dimensional (3D) periodic ordered, monodisperse colloids. Existing strategies for preparing ordered, monodisperse colloids generally manipulate the chemistry of colloid formation. However, only silica and some polymer materials can be routinely prepared with the narrow size distributions required for forming monolithic high quality ordered, monodisperse colloids. Unfortunately, these colloids do not exhibit the optical, nonlinear optical, or electro-optical functionality of other materials. Consequently, ordered, monodisperse colloids exhibiting desirable optical, nonlinear optical, or electro-optical properties are difficult, if not impossible, to prepare under the prior art.

BRIEF SUMMARY OF THE INVENTION

The present invention comprises ordered, monodisperse macroporous materials and the corresponding ordered, monodisperse colloids and particles that can be prepared from them.

The present invention further comprises methods for making the macroporous polymers by polymerizing monomers around a first-generation ordered, monodisperse colloidal template and then removing the template.

The present invention further comprises methods for making second-generation ordered, monodisperse colloids from a wide variety of materials by growing the second-generation colloid within the pores of the aforementioned ordered, monodisperse macroporous polymer and then removing the polymer. By using the first-generation colloidal template to imprint ordered, monodisperse macropores in the polymer and using the macroporous polymer as a mold for the second-generation colloid, the current methods allow the replication of the first-generation colloidal template morphology in the second-generation colloid.

The present invention additionally comprises the optical, filtration, and drug-delivery devices that can be prepared from the macroporous polymers and monodisperse colloids disclosed in this application.

BRIEF DESCRIPTION OF THE DRAWINGS

For a more detailed description of the present invention, reference will now be made to the accompanying Figures, wherein:

FIG. 3A has an inset showing the Fast Fourier Transform (FFT) of a low magnification image of a 40×40 $\mu m^2$ region;

FIG. 4A has an upper inset showing higher magnification and a lower inset showing the FFT of a low magnification image of a 40×40 $\mu m^2$ region. FIG. 4B has an inset showing the interconnecting inner pores at higher magnification;

FIG. 10A is an image of solid titania colloids with 262±5 nm diameter replicated from a poly(methyl methacrylate) template. FIG. 10B is an image of hollow titania colloids with 267±14 nm diameter and 31.4±2.3 nm shell thickness replicated from polystyrene templates after coating seven times. FIG. 10C is an image of thinner shell hollow titania colloids (15.4±1.0 nm shell thickness) replicated from the same template as in FIG. 10B after coating only twice and has an inset showing shell thickness as a function of the number of coatings. FIG. 10D is an image of the core-shell structure of a hollow zirconia/alumina colloid formed from successive deposition of alumina and then zirconia on the surface of a polystyrene template;

FIG. 11A is an image of a second-generation polypyrrole colloid replicated from a macroporous polystyrene film. FIG. 11B is an image of the deflated, hollow structure of the sample in FIG. 11A after being compressed. FIG. 11C is a top-view image of a hollow nickel colloid replicated from a polystyrene template with an inset showing a Fourier transform of a 40×40 $\mu m^2$ region in the (111) plane. FIG. 11D is an image of a solid $Al_2O_3$ colloid replicated from a poly(methyl methacrylate) template; FIG. 12A is a top-view image of a hollow titania colloid templated from a macroporous polystyrene film with a draw ratio D=1.3 and an inset showing a Fourier transform of a 40 μm×40 μm region in the (111) plane. FIG. 12B is a top-view image of a hollow titania colloid templated from the same macroporous polystyrene sample with a draw ratio D=1.7, a left inset showing the linear relationship of the axial ratio with $D^{3/2}$ and a right inset showing a Fourier transform of a 40 μm×40 μm region in the (111) plane. FIG. 12C is an image of the cross-sectional view of the colloid in FIG. 12B.

DETAILED DESCRIPTION OF THE INVENTION

The present invention stems from the discovery that polymer materials having ordered, monodisperse pores may be prepared by polymerizing monomers around an ordered, monodisperse colloidal template and that, following removal of the template, the resulting macroporous polymer may be used as a mold for preparing ordered, monodisperse colloids from a variety of materials.

Figure 1:
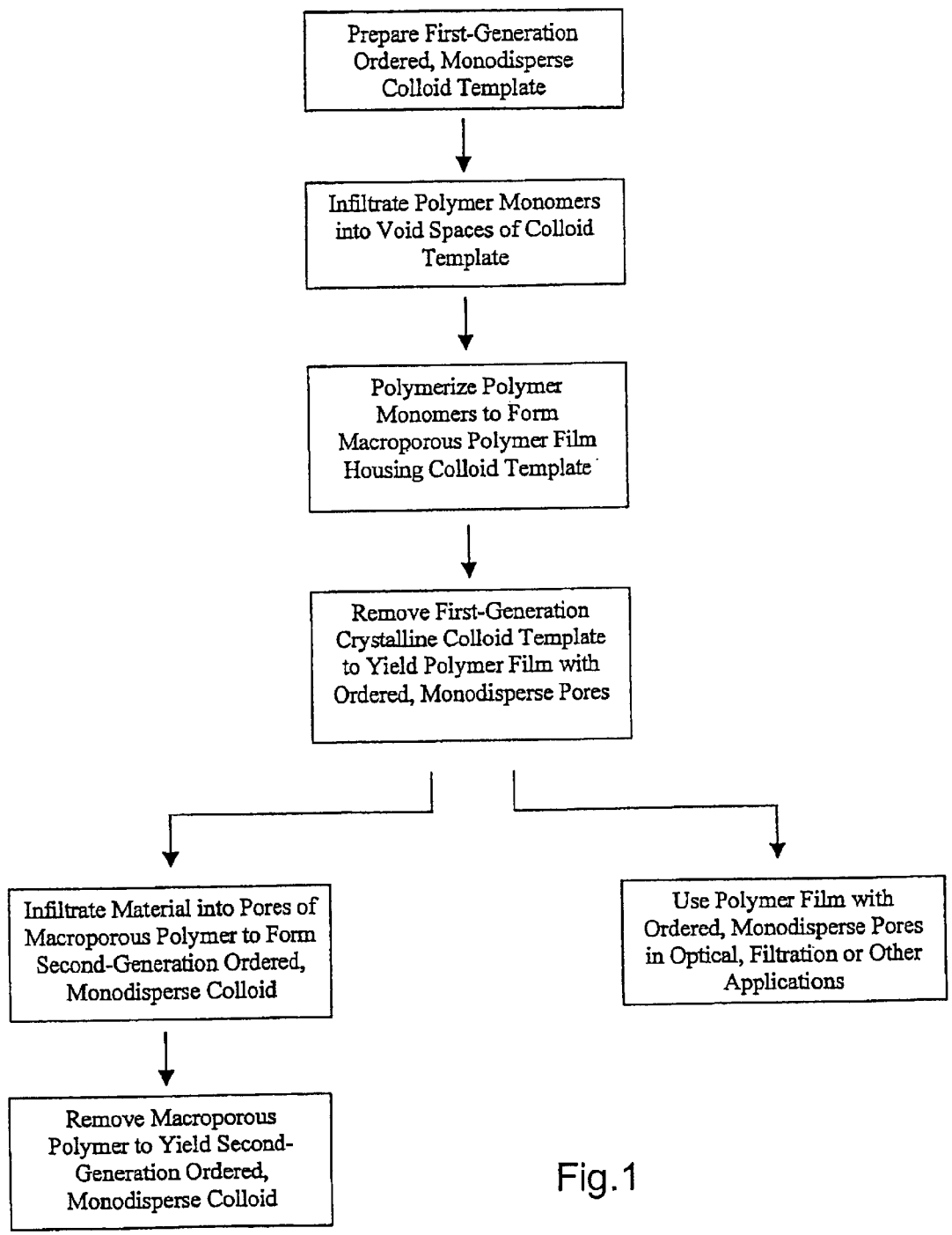
FIG. 1 is a flow diagram depicting the preparation of ordered, monodisperse macroporous polymers and their corresponding ordered, monodisperse colloids.

The principal steps for preparing the macroporous polymers and their corresponding colloids are depicted in FIG. 1. First, an ordered, monodisperse colloidal template is prepared from an appropriate material, such as silica nanospheres, according to an appropriate technique, such as the convective self-assembly method described below. This first-generation colloidal template exhibits a crystalline lattice that is ordered over a macroscopic distance—e.g., approximately 1 centimeter (cm) in length. Second, polymerizable monomers are infiltrated into the template to form a thin monomer film housing the template. Infiltrate in this context means to fill the void spaces in and around the template. Third, the monomers are polymerized to yield a solid polymer film. Fourth, the first-generation colloidal template is selectively removed, such as by chemical etching, to yield a polymer film having ordered, monodisperse and spherical pores that are interconnected with one another. The degree of interconnectedness can be precisely controlled through the viscosity of the starting monomer and/or the temperature of the polymerization. The resulting macroporous polymer can serve numerous uses including optical and micro-filtration applications.

Alternatively, the ordered, monodisperse macroporous polymer may serve as a mold for the growth of a new, second-generation colloid. Second-generation colloid refers here to a colloid whose morphology is patterned on the morphology of the first-generation colloidal template. This is accomplished by filling the ordered, monodisperse pores in the polymer, in whole or in part, with one or more of a variety of materials. The porous polymer may then be selectively removed to yield the second-generation colloid. This method leverages the crystalline nature of, for example, monodisperse silica colloids by effectively replicating their size distribution and arrangement in many other materials through a process analogous to the lost-wax method used to create molds for casting sculptures. In short, rather than developing separate chemical methods for preparing ordered, monodisperse colloids from a variety of materials, the present approach uses high-quality ordered, monodisperse colloids as templates for the formation of second-generation colloids from a variety of materials.

A key feature of the macroporous polymers disclosed herein is that they are ordered over large distances (at least about 1 cm) and highly uniform because of the assembly method used to construct them. Such long-range order and uniformity are essential, as they permit the preparation of macroscopically-sized ordered, monodisperse colloids. In addition, by using the macroporous polymers as molds for second-generation colloids, the macroporous polymers provide a wide range of control over particle formation, and diverse colloid shapes and architectures can be formed directly in a dense and crystalline format.

The first-generation colloidal template of the present invention can be prepared from monodisperse particles having appropriate properties. Important properties include size and size range; the ease with which they can be assembled into an ordered colloid; their compatibility with a variety of polymer systems; and the ease with which they can be selectively removed without damage to their polymer housing. Polymers may be introduced either through polymerization of the monomer, or through the introduction of a high-temperature melt of pre-polymerized material. A person of ordinary skill in the art will immediately recognize that many materials may potentially serve the as the first-generation colloidal template according to the disclosed methods. Therefore, without limiting the scope of the invention, the monodisperse particles utilized in the present disclosure are preferably silica nanospheres. Such spheres can be synthesized relatively easily over a narrow size range with controllable diameters, form monodisperse, ordered colloids through a convective self-assembly process, are compatible with a wide range of polymer systems, and can be selectively removed through chemical treatment with hydrofluoric acid. As used herein, the term silica is meant to include all glass materials such as glass microspheres.

The macroporous polymers of the present invention can be prepared from a variety of polymeric systems. The compatibility of porous polymers with many solvents and chemicals allow these materials to form a diverse range of colloidal materials within their pores including ceramic, polymer, semiconductor and metal materials. The polymer systems useful for preparing the macroporous polymers of the present invention include those capable of infiltrating the first-generation colloidal template described above. A person of ordinary skill in the art will immediately recognize that numerous polymer systems may be used. Without limiting the scope of the invention, representative polymer system examples include polystyrene, poly(methyl methacrylate) (PMMA), poly(methyl acrylate) (PMA), poly(ethyl acrylate) (PEA), poly(butyl acrylate) (PBA), poly(allyl methacrylate) (PAMA), poly(2-ethoxyethyl methacrylate), poly(allyl chloride), polyurethane, epoxy, polyacrylamide, polypyrrole, polyaniline, poly(p-phenylene vinylene) (PPV), poly(2-hydroxyethyl methacrylate), poly(vinyl acetate), poly(ethyl methacrylate-co-methyl acrylate), poly-α-methylstyrene, and poly(methylmethacrylate-co-butyl methacrylate).

The second-generation ordered, monodisperse colloids of the present invention may be prepared from a wide variety of materials including ceramics, polymers, semiconductors, metals and their precursors. In fact, because the morphology of the second-generation colloid is dictated largely by the morphology of the first generation colloidal template rather than by the intrinsic properties of the second-generation colloidal material, the choice of material for the second-generation colloid is largely unlimited. A person of ordinary skill in the art will immediately recognize that the ordered, monodisperse colloids formed by the method of the present invention can be prepared from numerous materials without departing from the scope of the invention. Without limiting the scope of the invention, representative examples include titania, zirconia, alumina, polypyrrole, poly(p-phenylenevinylene), cadmium sulfide, silver chloride, gold and nickel.

While the invention is susceptible to various modifications and alternative forms, specific embodiments thereof are shown by way of example and will herein be described in detail. It should be understood, however, that the embodiments are not intended to limit the invention to the particular form disclosed, but on the contrary, the intention is to cover all modifications, equivalents and alternatives falling within the spirit and scope of the present invention as defined by the claims.

Materials Used in the Examples

All solvents and chemicals are of reagent quality and are used without further purification except for tetraethoxysilane (Alfa, 99%) which is freshly vacuum distilled before use. 200 proof ethanol is obtained from Pharmaco Products. 29.6% ammonium hydroxide and 49% hydrofluoric acid are obtained from Fisher. Ultra-pure water (18.2 M$\Omega$cm$^{-1}$) is obtained from a Millipore Ultra-pure Water System. Commercially available monomers are used: methyl methacrylate (Aldrich), methyl acrylate (Aldrich), ethyl acrylate (Aldrich), butyl acrylate (Aldrich), allyl methacrylate (Aldrich), 2-ethoxylethyl methacrylate (Aldrich), styrene (Acros), allyl chloride (Aldrich), NOA 60 (polyurethane, Norland), NOA 73 (polyurethane, Norland), F113 (epoxy, Tra-Con), epoxy resin (Hardman), acrylamide (Aldrich), pyrrole (Aldrich), aniline (Fisher) and p-xylylenebis (tetrahydrothiophenium chloride) (Aldrich). The refractive indices of the resulting polymers are: PMMA (1.49), PMA (1.472~1.480), polystyrene (1.59~1.592), polyurethane (1.5~1.6), and epoxy (1.55~1.60). 2,2-Diethoxyacetophenone (Aldrich, 95%) and 2,2-dimethoxy-2-phenylacetophenone (Aldrich, 99%) are used as UV photo-initiator. N, N'-methylene-bisacrylamide is obtained from Aldrich. Titanium ethoxide (97%), zirconium-n-propoxide (70% in propanol) and aluminum sec-butoxide (97%) are purchased from Alfa. Titanium isopropoxide (97%) is obtained from Aldrich. Mineral oil is obtained from Acros. All other solvents and chemicals are purchased from Aldrich.

Monodisperse polystyrene nanospheres with diameters ranging from 100 nm to 1000 nm are obtained from Bangs Laboratories, Inc. (Fisher, Ind.). 20 ml scintillation vials and glass microslides (75×25×1 mm) are obtained from Fisher and cleaned in a chromic-sulfuric acid cleaning solution (Fisher) overnight, rinsed with Milli-Q water (18.2 M$\Omega$cm$^{-1}$), and dried in a stream of nitrogen. 0.2 mm Teflon spacers are obtained from Aldrich.

Instrumentation and Materials Characterization

Scanning electron microscopy (SEM) and Energy Dispersive X-ray Spectroscopy (EDAX) are performed on a Philips XL30 ESEM. A CrC-100 sputtering system was used to sputter a thin layer (3–4 nm) of gold on the samples before SEM analysis. The samples are tilted 30–40° to obtain the cross-sectional images. To determine the diameter and standard deviation of smaller inner pores, over 200 pores are sized using SEM. In-situ EDAX is used to evaluate the amount of residual silica. A Coulter N4 Plus Laser Dynamic Light Scattering (DLS) is used to size the particles. Transmission electron microscopy (TEM) is performed on a JEOL 2010 operating at 200 kV.

Transmission spectra of macroporous poly(methyl methacrylate) films were evaluated by transmission spectroscopy using an Ocean Optics ST2000 fiber optic UV-Near-IR spectrometer. Free-standing macroporous PMMA films are sandwiched by two microslides to ensure flatness. Pure PMMA films with the same thickness are used as references.

An Oriel model 60000 UV lamp with 68806 basic power supply is used to initiate the polymerization. A Fisher Isotemp 2150 circulator and an acrylic open bath are used to control the polymerization temperature to ±0.5° C. accuracy.

General Procedure for the Synthesis and Purification of Monodisperse Particles for the First-Generation Colloid Template Monodisperse silica nanospheres were synthesized following the Stober-Fink-Bohn method as described in Stober, W.; Fink, A.; Bohn, E. J. *Colloid Interface Sci.* 1968, 26, 62, which is hereby incorporated by reference. Through strict control of the reaction conditions, nanospheres with diameters ranging from 200 to 700 nm and relative standard deviation smaller than five percent were obtained. The sizes and size distributions of these samples were obtained from SEM and DLS measurements. Over 200 nanospheres were sized using SEM in order to arrive at the reported diameters. Before deposition, the silica alcosols were washed with 200 proof ethanol by repeated centrifugation and ultrasonic dispersion cycles in order to remove impurities, such as ammonia, water and unreacted tetraethoxysilane. Six cycles were usually performed.

Commercially available polystyrene nanospheres (Bangs Laboratories, Inc.) with diameters ranging from 100 to 1000 nm were purified with 200 proof ethanol by repeated centrifugation and ultrasonic dispersion cycles. Six cycles were usually performed.

General Procedure for the Synthesis and Growth of the First-Generation Ordered, Monodisperse Colloid Template Three-dimensionally ordered, monodisperse colloids with thicknesses ranging from one monolayer to approximately 50 μm were fabricated according to the method disclosed in P. Jiang, J. F. Bertone, K. S. Hwang, V. L. Colvin, "Single-Crystal Colloidal Multilayers of Controlled Thickness", *Chem. Mater.*, 11(8), 1999, 2132–2140, which is hereby incorporated by reference. A microslide is dipped into a purified silica/ethanol dispersion. Through convective self-assembly, an iridescent colloidal single crystal grows on the surface within three to four days while the ethanol evaporates. By adjusting particle size and volume fraction, the thickness of the resulting film can be precisely controlled. Typically, films of 10–50 layers can be prepared in a single coating, while successive coats can make films up to 200 layers (about 40 to 140 μm depending on the diameter of the nanospheres used).

Figure 2:
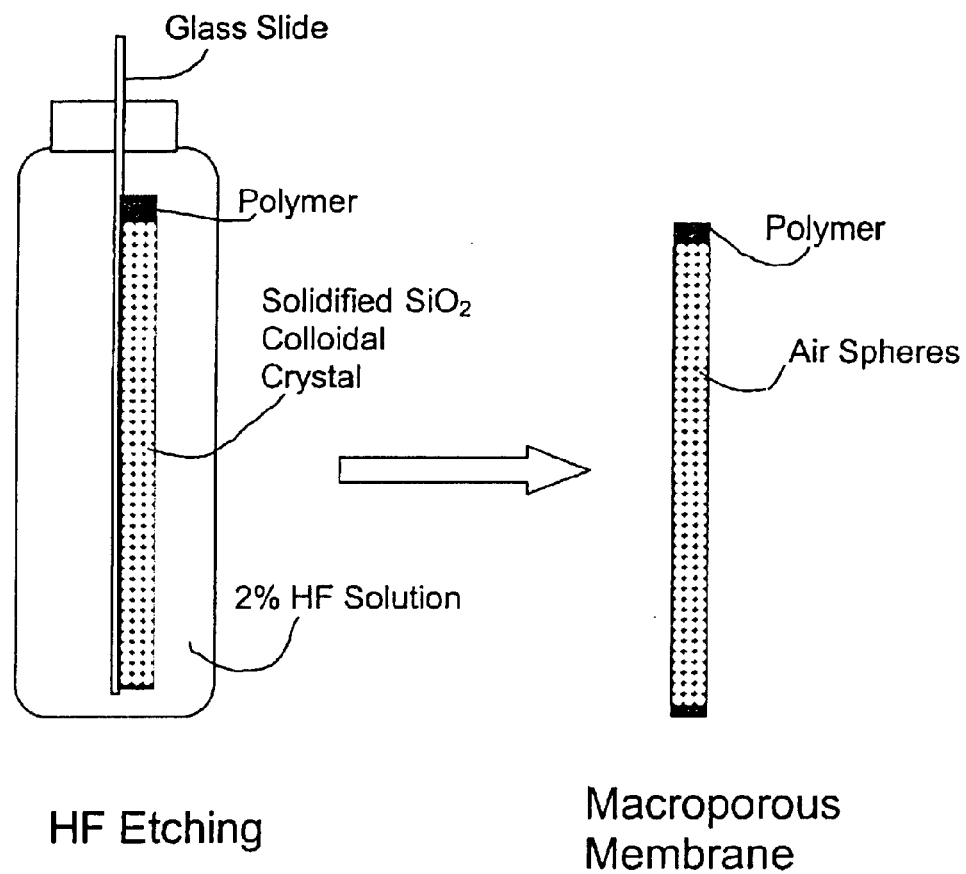
FIG. 2 is a simplified schematic showing the preparation of an ordered, monodisperse macroporous polymer in accordance with the present invention.

General Procedure for the Fabrication of Macroporous Polymers Having Ordered, Monodisperse Voids A simplified graphic of the procedure for producing three-dimensionally ordered, monodisperse macroporous polymers is shown in FIG. 2. The microslide with the first-generation ordered, monodisperse colloidal template on its surface is covered by another microslide and dipped in approximately 1–2 milliliters (ml) of a polymerizable monomer. Capillary forces draw the liquid monomer into the void spaces between the particles of the colloidal template. Filling times range from several seconds for a low viscosity monomer such as styrene to between five and ten minutes for a high viscosity monomer such as NOA 60, trade name for a polyurethane precursor. Due to refractive index matching between silica and monomer, the cell becomes transparent. The prepolymers are then cross-linked thermally at 60° C. or by exposure to UV light (320 W) for several hours. Afterwards one or both microslides are carefully removed and the freestanding polymer film is soaked in an approximately 4% hydrofluoric acid solution (about 15 ml) overnight to remove the silica. The resulting macroporous polymer is air-dried. Depending on the properties of different polymers, the products can be rigid (e.g., PMMA and polystyrene) or flexible (e.g., polyurethane). To form a stronger selfstanding macroporous polymer, a 0.1 mm Teflon spacer can be used to separate the two microslides. The films exhibit striking iridescence due to Bragg diffraction of visible light by the ordered air spheres in the polymer. The pore sizes and the thickness of the macroporous polymer film can be controlled by changing the size of the particles comprising the first-generation colloidal template and/or the number of layers in the template.

Figure 3A:
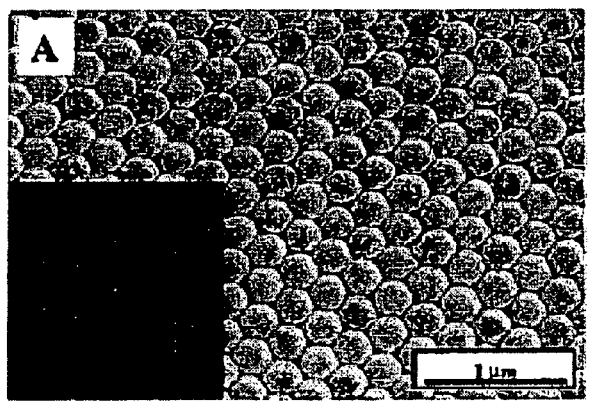
FIGS. 3A and 3B are top-view and side-view scanning electron micrograph images, respectively, of a crystalline silica colloidal template prepared from silica nanospheres of diameter 298.6 nm.
Figure 3B:
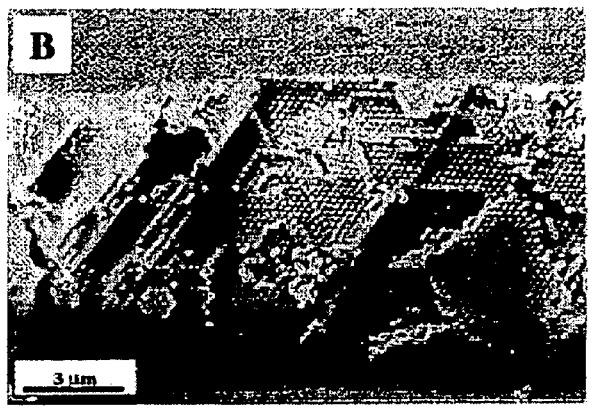
Figure 4A:
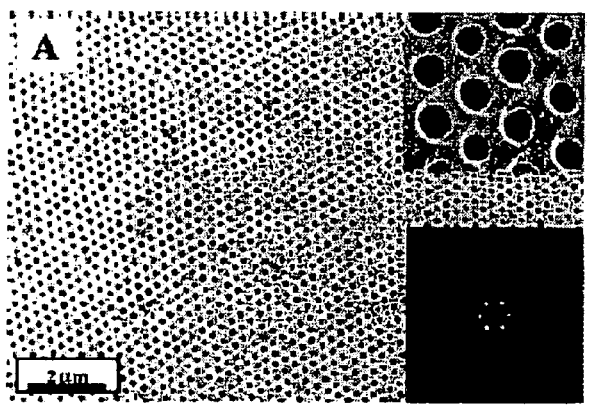
FIGS. 4A and 4B are top-view and side-view scanning electron micrograph images, respectively, of a typical macroporous polystyrene film formed using a 330.2 nm silica ordered, monodisperse colloid as a template.
Figure 4B:
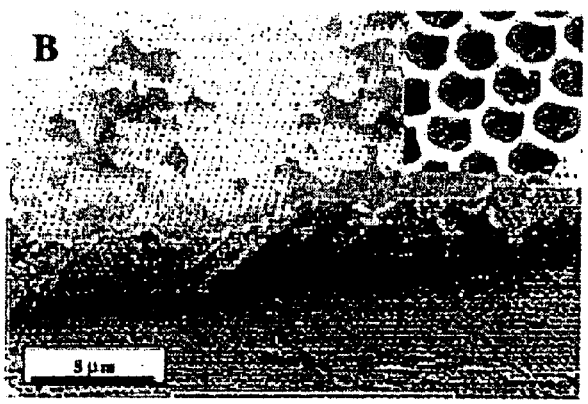

Ordered, Monodisperse Silica Templates and Ordered, Monodisperse Macroporous Polymers The present templating method provides a simple and versatile route for the production of macroporous polymers. FIGS. 3 and 4 are SEM images of an ordered, monodisperse silica colloidal template and a macroporous polystyrene film, respectively, prepared according to the present invention. The colloidal template depicted in FIG. 3 was prepared from silica nanospheres having a diameter of 298.6 nm whereas the polystyrene polymer depicted in FIG. 4 was prepared from a colloidal template comprised of 330.2 nm diameter silica nanospheres. A comparison of FIGS. 3 and 4 clearly shows that the high quality features of the silica colloidal template can be effectively translated to polymers so as to form ordered, monodisperse macropores. Moreover, since the template thickness and nanosphere size can be controlled, so can the macroporous structure. Void sizes ranging from 200 to 400 nm in diameter have been achieved, with good thickness uniformity across at least one centimeter in all cases. Monodisperse silica spheres can be made ranging from 20 nm up to several microns in diameter. It is believed that if high quality templates of the larger and smaller silica can be prepared, then void sizes over the entire nanometer size range should be feasible.

An important issue for many applications of macroporous polymer films is that the resulting films must be strong and resistant to cracking. While the mechanical properties have not been quantified here, the present methods allow for the use of any monomer whose resulting polymer is not soluble in the template etchant (e.g., hydrofluoric acid). Thus, glassy polymers (e.g., polystyrene) as well as rubbery polymers (e.g., polyurethane) work equally well in the present invention. Although the first-generation colloidal templates described herein have been studied to a thickness of 50 microns, colloidal templates can be prepared with a thickness of up to 1 millimeter (mm). However, their long-range crystalline order begins to degrade above about 200 microns. While such polycrystalline samples would not be ideal for optical studies, they may be more suitable for other applications requiring macroporous media.

Small Interconnected Pores in the Macroporous Polymer

Figure 5A:
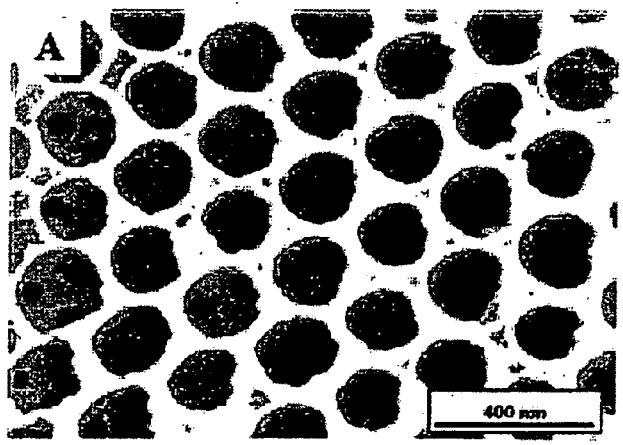
FIGS. 5A and 5B are scanning electron micrograph top-view images of the inner layers of two macroporous polystyrene membranes made using silica templates with 260.4 nm and 330.2 nm diameters, respectively.
Figure 5B:
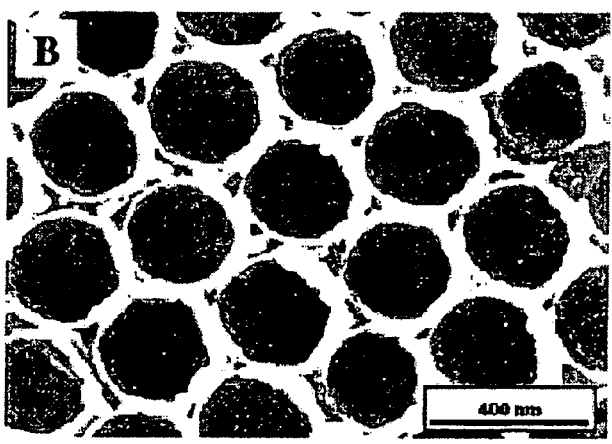

Visualization of the macroporous polymers using SEM reveals that the samples exhibit not only an ordered, monodisperse pore structure from the silica nanospheres, but also a uniform distribution of smaller pores that form around points where the silica nanospheres once touched. FIGS. 5A and 5B are SEM top-view images of the inner layers of two macroporous polystyrene membranes made using silica templates with different sphere diameters. FIG. 5A depicts a polystyrene film prepared from a colloidal template comprised of 260.4 nm diameter silica nanospheres and exhibiting an inner pore diameter of 55.8±3.8 nm. FIG. 5B depicts a polystyrene film prepared from a template comprised of 330.2 nm diameter silica nanospheres and exhibiting an inner pore diameter of 57.9±4.3 nm. The similarity of inner pore diameters in these two images despite the significant difference in the sizes of the silica nanospheres evidences the insensitivity of the size of the interconnecting inner pores to the size of the template silica spheres.

These small inner pores may be of utility in non-optical applications, such as size-selective filters or electrophoretic separations media. Given the potential importance of the interconnection pores in separation technologies, experiments were conducted to determine whether and over what range their size could be controlled. From their placement in the larger pores it is apparent that these smaller pores are located where the silica nanospheres were in closest proximity. One possible explanation for their origin is that the initial monomer solution could not wet the silica nanosphere surfaces completely, leading to gaps in its filling of the template. Fluid viscosity is known to be an important factor governing the effective filling of porous materials; more viscous liquids are less able to completely absorb into the available free space due to both wetting and capillary phenomena. Alternatively, polymerization shrinkage could result in the formation of the pores. The three monomers employed in this work undergo approximately twenty to thirty percent volume shrinkage upon polymerization. Because the silica colloidal template is effectively incompressible, thin areas of polymer such as those located between spheres could yield due to shrinkage, thereby forming the smaller pores observed.

To evaluate these issues, NOA 60, a particularly viscous monomer, was applied and polymerized at different temperatures. A Fisher Isotemp 2150 circulator and an acrylic open bath were used to control the polymerization temperature of NOA 60. At low temperatures the prepolymers are very viscous and take about five minutes to fill the cell while at high temperatures they are less viscous and fill the cell in several seconds. After allowing the monomer to equilibrate for thirty minutes in the isotemp bath, the monomer was polymerized by exposure to UV light as described above.

Figure 6A:
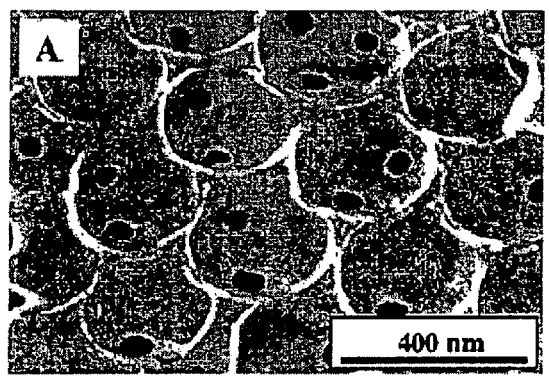
FIGS. 6A, 6B and 6C are scanning electron micrograph top-view images of the inner layers of three macroporous polyurethane membranes polymerized using identical 353.0 nm diameter silica templates at 70° C., 40° C. and 22.5° C., respectively.
Figure 6B:
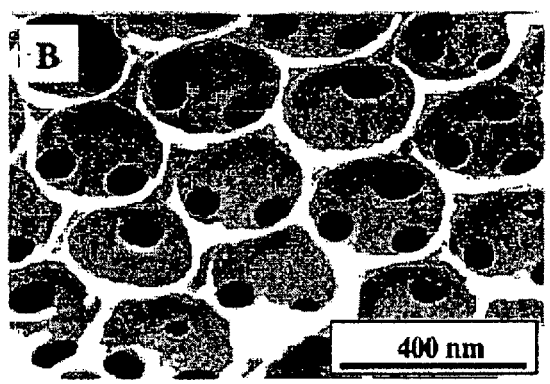
Figure 6C:
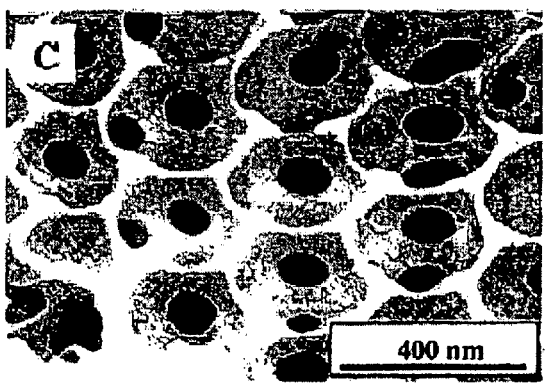

The temperature of the initial monomer solution during application and polymerization has a significant effect on the size of the internal pores. FIGS. 6A, 6B and 6C show top-view SEM images demonstrating that the size of the smaller inner pores in macroporous NOA 60, a commercial polyurethane, could be varied through control of monomer temperature. In each case, a silica colloidal template comprised of 353 nm diameter silica nanospheres was used. At 22.5° C., the NOA 60 monomer was quite viscous and produced inner pores having a diameter of 117.6±8.3 nm (FIG. 6A). At 40.0° C. and 70° C., respectively, inner pores of made 90.6±6.5 nm and 60.7±4.9 nm diameter were produced (FIGS. 6B and 6C, respectively). Other parameters, such as the shrinkage of the monomer upon polymerization, as well as its ability to wet the silica surface, had much less effect on the observed morphology. Thus, by adjusting application and polymerization temperature or otherwise controlling the viscosity of the monomer, the size of smaller interconnecting pores can be controlled. Efforts to create smaller pores using very low viscosity monomers, however, were not successful and average inner pore diameters of 50 nm were typical. It may be that this lower limit is indeed the result of polymerization shrinkage. If so, the creation of inner pores whose diameters are smaller than 50 nm will require low shrinkage monomers.

Optical Properties of Macroporous Polymers

Because of the ordering of the pores within the polymer, the ordered, monodisperse macroporous polymers exhibit diffraction phenomena that lead to striking optical properties. The most prominent is the presence of a strong diffraction peak in the optical spectrum. Certain basic properties of these systems can be described by Bragg's law. At normal incidence (where $\sin \theta_{inc}=1$), the spectral position of the peak in the optical density, $\lambda_{peak}$, can be found from:

$$\lambda_{peak} = 2 n_{eff} d_{111}, \quad [1]$$

where $n_{eff}$ is the average refractive index of the entire medium (air and polymer) at optical frequencies and $d_{111}$ is the interlayer spacing of the air spheres along the (111) direction. This spacing is related to the sphere diameter D by $d_{111} = \sqrt{2/3}\,D$ for any close-packed structure.

Figure 7:
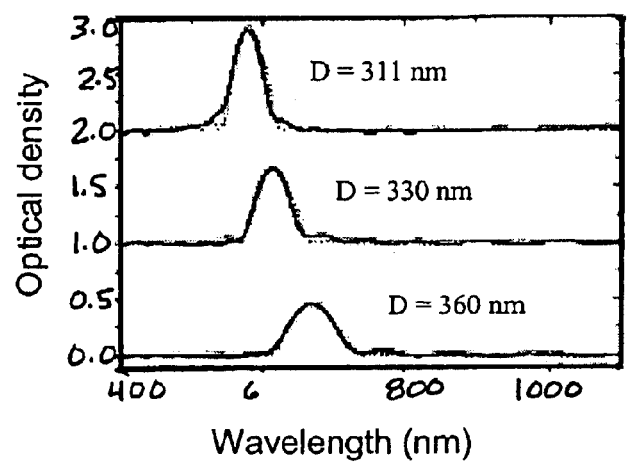
FIG. 7 depicts experimental (solid lines) and calculated (dotted) optical transmission spectra at normal incidence of macroporous poly(methyl methacrylate) film having 311 nm, 330 nm and 360 nm pore diameters. All three calculated curves have been scaled by an overall multiplicative factor of 0.75, as described in the text.
Figure 8:
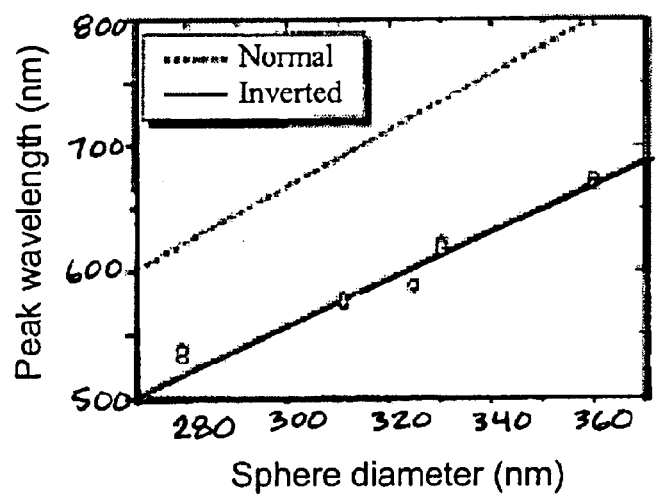
FIG. 8 shows the wavelength at which the optical transmission spectrum peaks, $\lambda_{peak}$, as a function of sphere diameter. The open circles are experimental points measured at normal incidence from the films in FIG. 7. The solid curve shows the calculated value of $\lambda_{peak}$ for the ordered, monodisperse macroporous polymers while the dashed curve shows the value for the ordered, monodisperse silica templates.

Optical studies of the macroporous polymer films produced illustrate the diffractive properties of the matrix and provide additional evidence of the highly crystalline quality of these samples. FIG. 7 depicts the optical transmission spectra for three macroporous PMMA polymer films made from silica spheres ranging from 311 to 360 nm in diameter. A small incoherent scattering background was subtracted from this data in order to facilitate comparison with a theoretical model of photonic band gap behavior (dashed lines), described further below. FIG. 8 shows the predicted peak position, $\lambda_{peak}$, as a function of nanosphere diameter. The data in FIGS. 7 and 8 are in agreement with a model which assumes a perfect three dimensional lattice of ordered air spheres in a polymer matrix.

While Bragg's law explains the spectral position of the peak, a theoretical treatment appropriate to strongly diffracting layers is necessary to provide a quantitative model of the optical spectra. The scalar wave theory developed for periodic dielectric structures can be easily applied to these materials. In short, Maxwell's equations are solved for a periodic dielectric assuming that one may neglect diffraction from all but one set of crystalline planes—in this case, the (111) planes. While this approximation is not entirely correct, the model is tractable and is appropriate for comparison with normal-incidence transmission spectra. In particular, although this theory always predicts a larger optical density than observed, the predicted spectral bandwidths are in good agreement with observations. Thus, this formalism can be used to evaluate whether the observed bandwidths are controlled by defects in the sample or are intrinsic to the film. In principle, the calculation contains no adjustable parameters, since the size of the nanospheres and the sample thickness are independently determined from SEM measurements, and the refractive index of the polymer is known. However, because of the known difficulties in predicting the magnitude of the peak optical density, an overall multiplicative scaling factor is used. This facilitates comparisons of the measured and calculated bandwidths.

The predictions of the scalar wave approximation are compared to experimental data in FIG. 7. The samples used to obtain these data (solid lines) were all thin, on the order of nine to twelve layers. All three theoretical curves (dotted lines) have been scaled by a multiplicative factor of 0.75, but otherwise there are no adjustable parameters. The remarkable agreement between theory and experiment provides evidence that these samples are not highly defective. In addition, the close correlation rules out the possibility that residual silica was left behind. Finally, optical characterization of this type illustrates that the film did not undergo significant dimensional changes during the hydrofluoric acid treatment and thus faithfully reproduced the morphology of the first-generation colloidal template. FIG. 8 shows the predicted and measured spectral positions of the optical stop bands, as a function of sphere diameter, obtained from data such as that shown in FIG. 7. The solid line is the prediction from the scalar wave theory, which is nearly identical to that obtained from Bragg's Law, equation [1] above, for films thicker than ~20 layers. For reference, the dashed line shows the predicted spectral positions for the colloidal templates—i.e., "normal" samples, with silica nanospheres surrounded by air rather than the "inverted" macroporous samples that represent a "negative" image of the template. The ~100 nm shift between the two is a result of the substantial decrease in $n_{eff}$, resulting from the lower volume fraction occupied by the polymer in the "inverted" samples.

One important issue for many applications is the net void volume, or surface area, in these systems. EDAX analysis of the macroporous polymer films show only trace amounts of silica (less than 0.7%), indicating that the treatment removes almost all of the template. This is not surprising due to the high dissolution rate of silica in aqueous HF ($k_1 = 5 \times 10^{-8}$ g $SiO_2\,sec^{-1}cm^{-2}\,M_{HF}^{-1}$) and the internal connection between silica spheres. Additionally, the predicted optical spectra are highly sensitive to the volume fraction occupied by the polymer. The predictions shown in FIGS. 7 and 8 assume that the air spheres are close-packed, and that the polymer fills the remaining approximately twenty-six percent of the total volume. The good agreement with experimental results provides further evidence that the polymer pore structure effectively replicates the morphology of the first-generation colloidal template.

Figure 9:
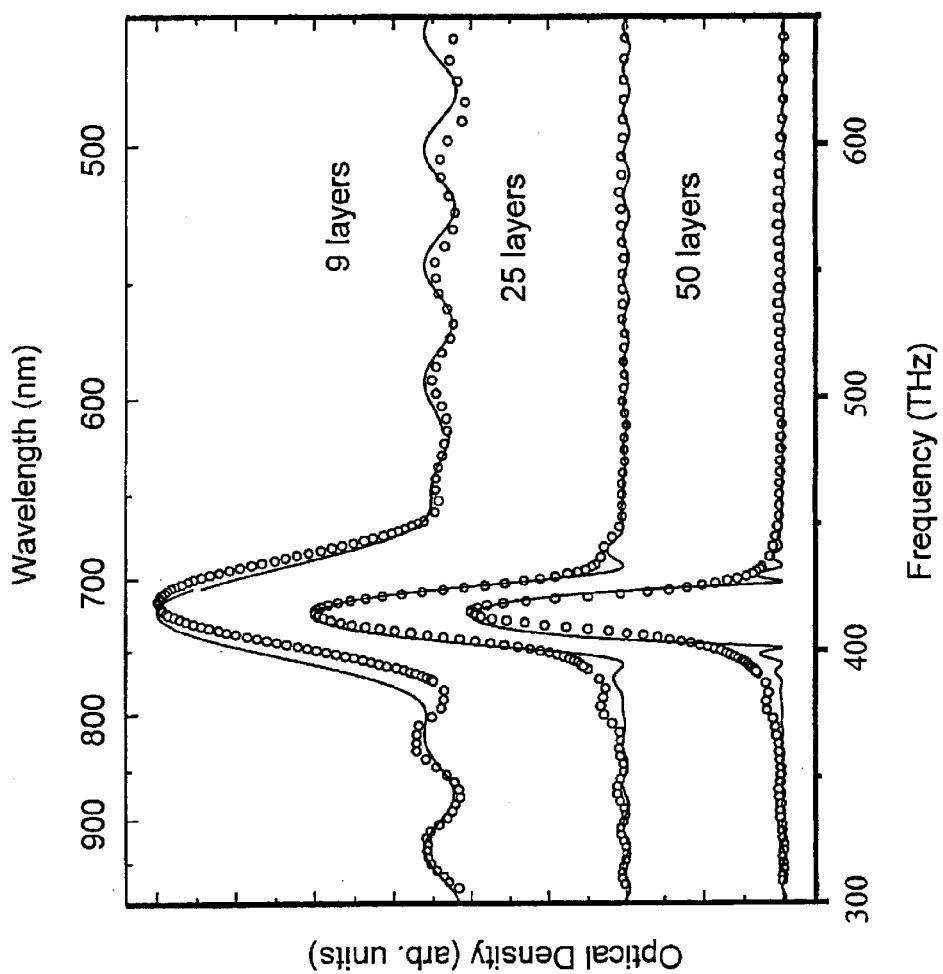
FIG. 9 shows the normalized optical transmission spectra of ordered, monodisperse macroporous polystyrene films as a function of the number of layers in the first-generation silica colloidal template from which they were prepared.

Clearly, these ordered, monodisperse macroporous polymers act as a spectral filter. As depicted in FIG. 9, the bandwidth of the filter can be tailored by controlling the thickness (number of layers) of the colloidal template. FIG. 9 shows the width of the spectral filter for a ordered, monodisperse macroporous polystyrene film as a function of the number of layers in the first-generation colloidal template. For a macroporous polystyrene film prepared from a silica template having nine layers, the spectral window is quite broad (approximately 60 nm based on full-width at half-height). This spectral width decreases as the number of layers in the first-generation colloidal template increases. For example, a macroporous polystyrene film prepared from a silica template having fifty layers possesses a much narrower spectral window (approximately 30 nm based on full-width at half-height).

Second-Generation Ordered, Monodisperse Colloids

The second-generation ordered, monodisperse colloids of the present invention can be prepared from a variety of materials including ceramics, polymers, semiconductors, metals and their precursors. The method varies in each case depending on the material to be prepared. The general approach, however, is to expose the monodisperse, ordered macroporous polymer film to a precursor of the desired colloidal material, which then infiltrates the pores within the polymer. Then, this precursor material, which deposits in the macropores is condensed to its solid form and the macroporous polymer is removed by, for example, heating or dissolution. The resulting solid then reflects the size, shape and organization of the original macropores.

Ceramic colloids of titanium, zirconium and aluminum can be prepared through the hydrolysis [2] and condensation [3] of their alkoxides in alcoholic media:

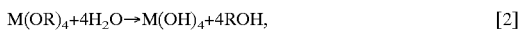

$$M(OR)_4 + 4H_2O \rightarrow M(OH)_4 + 4ROH, \qquad [2]$$

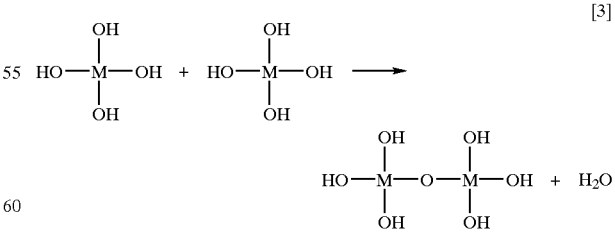

Titanium isopropoxide (70% in 2-propanol), titanium ethoxide (75% in 200 proof ethanol), zirconium n-propoxide (20% in n-propanol) and aluminum sec-butoxide (50% in 2-butanol) are used as precursors to deposit metallic oxides into the voids of the macroporous polymer. First, the macroporous polymer is soaked in the precursor solution until it becomes transparent due to the close refractive index match to the alcohol. Next, the film is removed and placed in ultra-pure water (Milli-Q, 18.2 MΩ cm$^{-1}$) for 8 hours followed by drying under nitrogen. As metal oxides begin to form, the film turns slightly hazy. After repeated exposure to the alkoxide solution, followed by immersion in water, the film ultimately becomes opaque. After filling the voids of the macroporous polymers with metal oxides, the polystyrene templates can be dissolved in toluene and PMMA templates can be burned out by propane torch for one minute to release the ordered, monodisperse colloid. The typical size of the synthesized colloid is several square millimeters. To make larger, more robust colloids ideal for optical characterization, a transparent polyurethane thin-film backing can be used to "glue" the colloids onto glass slides by photopolymerizing the polyurethane precursor NOA 60 for several minutes under an ultraviolet lamp (320 W). To avoid penetration of polyurethane monomers into the voids of the hollow spheres replicated inside polystyrene films, NOA 60 is pre-polymerized for ten seconds under ultraviolet light into a very viscous oligomer before "gluing" the colloids onto the polyurethane, which can then be completely polymerized. After dissolving the polymer template in toluene, a robust ordered, monodisperse colloid as big as several square centimeters is formed.

Figure 10:
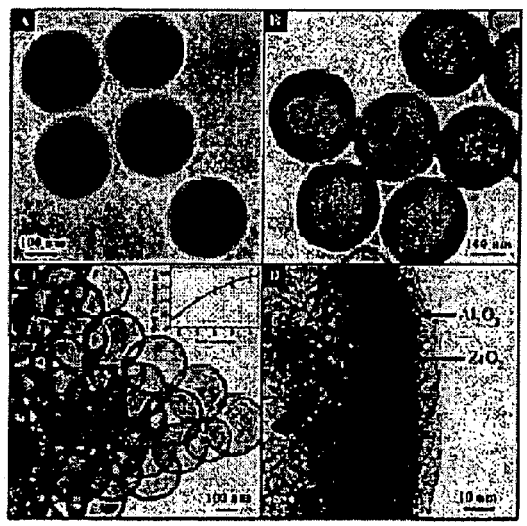
FIGS. 10A, 10B, 10C and 10D are transmission electron microscopy images of monodisperse colloids made by the templating method of the present invention.
Figure 11:
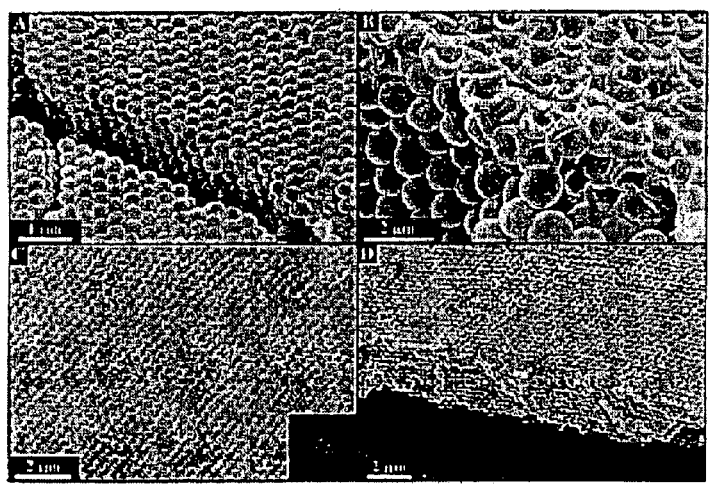
FIGS. 11A, 11B, 11C and 11D are scanning electron micrograph images of ordered, monodisperse colloids.

FIGS. 10A, 10B, 10C and 10D depict transmission electron microscopy (TEM) images of monodisperse ceramic particles made by the templating method. FIG. 10A shows solid titania colloids comprised of 262±5 nm diameter spheres replicated from an ordered, monodisperse macroporous PMMA film after seven coats of titanium isopropoxide. FIG. 10B shows hollow titania colloids with 267±14 nm diameter and 31.4±2.3 nm shell thickness replicated from ordered, monodisperse macroporous polystyrene films after seven coats of titanium isopropoxide. FIG. 10C shows thinner shell hollow titania colloids (15.4±1.0 nm shell thickness) replicated from the same colloidal template used in FIG. 10B but with only two coats of titanium isopropoxide. The inset of FIG. 10B depicts the relationship between the shell thickness and the number of coatings. Because the colloids are formed through successive deposition of thin layers of ceramics, FIGS. 10B and 10C indicate that shell thickness can be precisely controlled. FIG. 11D is an SEM image of a solid alumina colloid replicated from a PMMA template.

The nature of the colloid particles formed—hollow or solid—appears to be a function of the polymer used. When macroporous polystyrene serves as the host for colloidal growth, most materials conformally coat the interior polymer pore surface during filling. In these polymers, colloids grow from the outside in and, after thermal treatment and polymer removal, hollow capsules result. A very different process is observed when macroporous PMMA is used as a template. Here, the ceramic layer pulls away from the host polymer and forms solid spheres that are smaller than the cavities. Colloidal formation in this instance proceeds from the center outwards, and colloids grow successively larger after repeated immersion/filling cycles. Other inorganic materials such as CdS and AgCl also show a tendency to adhere strongly to polystyrene but not to PMMA.

FIG. 10D depicts the core-shell structure of a hollow zirconia/alumina colloid formed from successive deposition of alumina and then zirconia (each coated twice) on the surface of a polystyrene template. Because zirconia has a higher electron density than alumina, it appears darker in electron microscopy images. In-situ Energy-Dispersive X-ray (EDAX) and microprobe analysis indicate the expected stoichiometric proportions of the materials.

Metallic nanospheres and nanoshells are also of interest because of their optical and physical properties, yet they are notoriously difficult to prepare in the 50 to 500 nanometer range by standard chemical methods. They were formed here according to the present invention by adapting the metal templating chemistry used to infiltrate opals described in H. Yan et al., Adv. Mater. 11, 1003 (1999), which is hereby incorporated by reference. Metal oxalate salts which adhere to the polymer walls are reduced by calcinations at 450° C. for 10 hours. As an example, nickel oxalates were formed in polystyrene templates using 0.2 M nickel (II) acetate ethanol/water (v/v: 1/1) solutions as precursors and 1 M oxalic acid ethanolic solutions as precipitating agents. The polystyrene/oxalate composites were then calcined in flowing nitrogen at 450° C. for 10 hours. This treatment allowed the polystyrene to be burned out and converted the nickel oxalate into metallic nickel as shown in Equation 4:

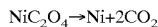

$$NiC_2O_4 \rightarrow Ni + 2CO_2 \qquad [4]$$

FIG. 11C is an SEM top-view image of an ordered, monodisperse nickel colloid prepared according to the present method using a macroporous polystyrene film. As in the case of the ceramic nanoparticles, hollow colloids are formed which retain the shape of the initial oxalate shells. In the same way, hollow colloids of metallic cobalt, copper, cadmium and lead have also been made.

Various inorganic ordered, monodisperse colloids can be prepared through precipitation reactions. To prepare cadmium sulfide, for example, a macroporous polymer film is soaked in 0.2 M Cd(NO$_3$)$_2$ aqueous solution (with 20% by volume ethanol) until it becomes transparent. Next, the film is removed and immersed in 0.2 M Na$_2$S aqueous solution (with 20% by volume ethanol) for 8 hour. After repeated exposure to the Cd(NO$_3$)$_2$ solution, followed by immersion in Na$_2$S solution, the films ultimately become yellowish. The cycle of penetration and reaction can be repeated several times to make solid CdS colloids in a PMMA template or hollow CdS colloids with different shell thicknesses in a polystyrene template. The removal of the macroporous polymer and the reinforcement of the colloids with polyurethane backing films are similar to the preparation of ceramic colloids as described above.

Second-generation polymeric colloids were also investigated. Polypyrrole (Ppy) is attractive as a target material because of its possible use in drug delivery applications. FIG. 11A is an SEM image of an ordered, monodisperse polypyrrole colloid formed through the successive exposure of a macroporous polystyrene film to a 20% (v/v) pyrrole ethanol solution and a 0.05 M FeCl$_3$ aqueous solution. When the sample is compressed prior to imaging as in FIG. 11B, the colloids collapse into irregular shapes, much like deflated basketballs. Existing methods for forming polymer capsules rely on layer-by-layer assembly of polyelectrolytes, or the formation of block co-polymer assemblies, which necessarily limit the choice of polymer materials. In the present method, the only constraint placed on the choice of material is that its polymerization must occur under conditions that do not destroy the macroporous polymer mold.

Solid poly(p-phenylenevinylene) (PPV) and Au ordered, monodisperse colloids have also been prepared by filling the macroporous polystyrene films with PPV precursor in methanol solution or gold nanocrystals in hexane solution, respectively. The solvents were slowly evaporated to deposit solids deep inside the pores and the macroporous polystyrene film was removed by dissolution in toluene. The general nature of this physical filling allows the preparation of solid ordered, monodisperse colloids from a large number of other materials, including many available nanocrystals.

To evaluate how effectively the templating process captures the uniformity of the macropores in the polymer, the final particle size and size distribution were measured using SEM images such as the one shown in FIG. 11C. These sizes are compared to the characteristics of the starting silica colloids and macroporous polymer voids in Table 1. Over 200 particles were

TABLE 1

| Material | Polystyrene Template (nm) | PMMA Template (nm) |
|---|---|---|
| $TiO_2$ | 325.0 (5.2%) | 267.8 (4.8%) |
| $ZrO_2$ | 327.1 (5.1%) | 271.3 (5.3%) |
| $Al_2O_3$ | 327.3 (4.7%) | 273.7 (5.5%) |
| Polypyrrole | 322.0 (4.8%) | N/A |
| PPV | 310.5 (5.6%) | N/A |
| CdS | 323.7 (6.3%) | 269.6 (6.1%) |
| AgCl | 325.2 (5.7%) | 270.9 (5.2%) |
| Au | 319.7 (5.3%) | N/A |
| Ni | 306.6 (5.9%) | N/A | measured in the SEM images to arrive at the values reported. As is observed from Table 1, size distributions remained remarkably narrow after the templating steps. Macroporous polystyrene samples having an average pore diameter of 333 nm templated from silica colloids composed of 336 nm diameter silica nanospheres were used to make all spheres in the middle column, whereas macroporous PMMA samples having an average pore diameter of 288 nm templated from silica colloids composed of 294 nm diameter silica nanospheres were used to make all spheres in the right column. The average diameters of colloids templated from PMMA templates show a roughly ten percent reduction from the diameters of the macropores, which is reasonable given the shrinkage that occurs during the template removal process. Although there are chemical methods for producing some of these colloids with relatively narrow size distributions (around 10 percent), this templating approach provides a strategy for creating a wide range of highly monodisperse colloids (approximately five percent standard deviation in sphere radii).

In addition to providing for a remarkable range of colloidal materials and architectures, the macroporous polymers of the present invention are pliable materials that can be compressed or extended to form unusual void shapes. Several experiments were conducted to determine whether colloids grown in such distorted voids would adopt non-spherical shapes. Non-spherical colloids may offer advantages over their spherical counterparts in applications that require periodic structures with lower symmetries. In addition, monodisperse ellipsoidal latex colloids have been suggested as a potential model for rigid rod systems, such as liquid-crystal polymers and biopolymers. Methods for preparing inorganic, polymeric, and metallic colloidal cubes, ellipsoids, and rods have been reported for specific materials, but sample homogeneity is poor and a general methodology has not yet been developed.

Figure 12:
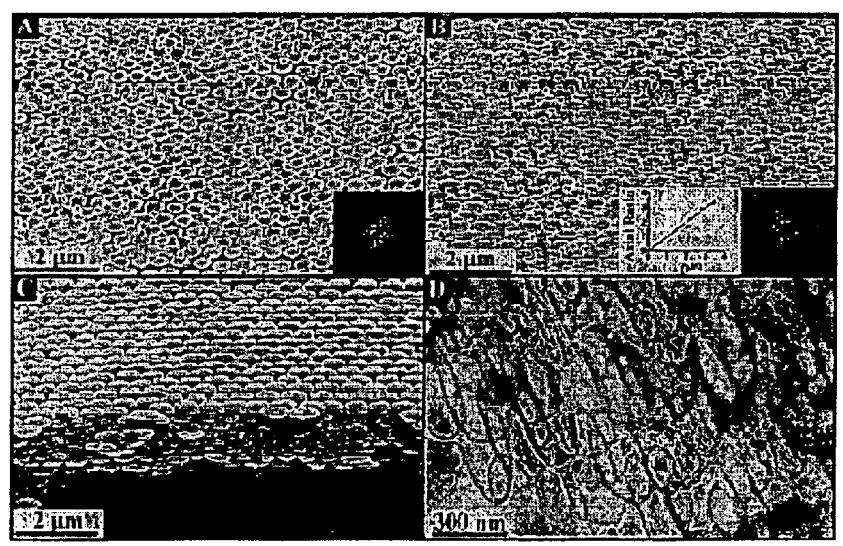
FIGS. 12A, 12B and 12C are scanning electron micrograph images of various ordered, monodisperse ellipsoidal colloids.
FIG. 12D is a transmission electron microscopy image of the colloid in FIG. 12B.

When a macroporous polymer film is heated above its glass transition temperature ($T_g$), it becomes rubbery and can be stretched by a uniform uniaxial or biaxial force. The draw ratio, D, characterizes the magnitude of this extension and for one dimensional stretching is defined as the ratio of the extended length to the starting length. To avoid collapse of the voids during the heating, the pores can be filled with mineral oil prior to heating, which is removed by a heptane wash afterwards. If the film is then quickly cooled down below $T_g$, while still constrained in the deformed state, the shape of the stretched voids, oblate for a two-dimensional extension and ellipsoidal for a one-dimensional extension, is fixed into the glassy, inflexible polymer. These non-spherical voids can be replicated into many different materials using the same methods described above. FIGS. 12A and 12B show top-view SEM images of two hollow ellipsoidal titania colloids with different axial ratios (p), both templated from macroporous polystyrene ($T_g=94°$ C.). The ellipsoidal shapes of the colloids and the long-range order in the (111) plane are confirmed by the elongated hexagonal patterns of the FFTs (insets of FIGS. 12A and 12B). The lengths of both the long axis and the short axis of these ellipsoidal colloids made with differing draw ratios ($D_A=1.3$ and $D_B=1.7$) were measured. The sample in FIG. 12A has a 489±27 nm long axis, a 333±18 nm short axis, and an axial ratio of 1.47; the sample in FIG. 12B has a 624±43 nm long axis, a 281±14 nm short axis and an axial ratio of 2.22.

Using the method described, a high degree of control over the aspect ratio of the resulting colloids can be achieved. The axial ratios (p) of ellipsoidal samples can be predicted from their corresponding draw ratios (D) by assuming the volume of the voids does not change during the stretch; this assumption is reasonable since the voids are filled with mineral oil, which is not likely to undergo a significant change in density as a result of the modest forces during extension. A brief analysis reveals that the axial ratio of the particles, p, can be related to the draw ratio, D, through:

$$p=b/a=D^{3/2} \quad [5]$$

where b and a are the lengths of the long and short axis of the ellipsoidal colloids, respectively. The measured axial ratios of four ellipsoidal samples with differing draw ratios shown in the left inset of FIG. 12B agree well with this simple model. A similar result has also been observed in a polystyrene latex/poly(vinyl alcohol) system. Axial ratios greater than 5.0 are not feasible as the polymer begins to tear as a result of the tensile force. The use of more flexible polymers such as poly(dimethylsiloxane) (PDMS) may alleviate this issue.

The ordering perpendicular to the close-packed (111) axis of these elliptical colloids is apparent in the cross-sectional SEM image in FIG. 12C, which is taken from the same sample imaged in FIG. 12B. The sample templated from polystyrene is hollow as shown by the broken colloids in FIG. 12C and further confirmed by the TEM image in FIG. 12D. The ellipsoids are monodisperse with a uniform shell thickness. Thus, heating and stretching does not change the surface properties of the polymer substantially, so all of the morphologies and materials developed for the non-stretched templates can be extended to these non-spherical examples. Ellipsoidal ordered, monodisperse colloids with high refractive index may pave the way for building new photonic crystals with superior optical properties because geometric anisotropy has been shown to widen the photonic band gap of colloidal materials.

Deconstructing the Ordered, Monodisperse Colloids

Ultrasonication is a well-established method for breaking up colloidal aggregates in solution, and it was used successfully to fragment these colloidal films. Brief treatments (30s in a 40 W ultrasonic bath) in solvents such as toluene yielded larger colloidal fragments (several millimeters in size), which were ideal specimens for TEM studies of the array geometry depicted in FIG. 10C. Longer treatments, up to ten minutes, provided dispersed material of the type shown in FIGS. 10A and 10B. The dispersed colloids exhibit uniform surfaces. While the geometry of the macroporous host contains windows between the spherical voids, colloidal material does not appear to template these channels at any significant density. This can be attributed to the relative size of the windows, which is only ten to twenty percent of the pore size, and to the colloidal shrinkage induced during the condensation or polymerization reactions.

Except for ultrasonication in appropriate solvents, the second-generation ordered, monodisperse colloids are remarkably robust, high-quality materials. Their long-range order is apparent in SEM images, such as that in FIG. 11C. A fast-Fourier transform (FFT) of the image provides a measure of order in the (111) plane (inset of FIG. 11C) and it is apparent that the spheres are arranged in a close-packed array. Although defects such as cracks and point defects can be observed, the single crystalline nature of the starting silica colloid is clearly retained during the templating process. The ordering perpendicular to the close-packed (111) axis is best visualized in cross-sectional images, such as FIG. 11D depicting an ordered, monodisperse colloid composed of solid alumina spheres. These samples are films, not monoliths, and their (111) axis is perpendicular to the underlying glass substrate. The film thickness can be precisely controlled from single monolayers to over 100 layers due to the faithful replication of the starting silica ordered, monodisperse colloid. Because of their long range order, these samples possess a photonic stop-band comparable to that seen in macroporous titania. The spectral position and width of this band for hollow titania colloids depends sensitively on the shell thickness and on the overlap between adjacent spheres. Thus hollow spheres offer another two new parameters, namely shell thickness and aspect ratio, for engineering photonic properties in colloidal systems.

It should be understood that although method claims recite the steps involved in practicing embodiments of the claimed invention, method claims do not necessarily dictate the order in which the steps are to occur. Consequently, the method claims below are not limited to the sequential order of the recited steps.

The foregoing detailed description and examples have been given for clarity of understanding only. No unnecessary limitations are to be understood therefrom. While preferred embodiments of the present invention have been shown and described, it will be understood that variations can be made to the preferred embodiments without departing from the scope of, and which are equivalent to, the present invention.

What is claimed is:

1. A method for preparing a second-generation colloid comprising the steps of:
   (a) providing a colloidal template;
   (b) infiltrating said colloidal template with polymerizable components;
   (c) polymerizing said polymerizable components;
   (d) selectively removing said colloidal template to yield a porous polymer;
   (e) heating said porous polymer above its glass transition temperature;
   (f) deforming said porous polymer such that said porous polymer includes non-spherical pores;
   (g) cooling said porous polymer below its glass transition temperature;
   (h) depositing a material into the non-spherical pores of said porous polymer so as to form said material into ellipsoidal particles having an aspect ratio between 1.47 and 5.0; and
   (i) selectively removing said porous polymer to form a second-generation colloid.

2. The method according to claim 1 wherein said second-generation colloid comprises a ceramic material.

3. The method according to claim 1 wherein said second-generation colloid comprises a material selected from the group consisting of alumina, titania and zirconia.

4. The method according to claim 1 wherein said second-generation an inorganic salt.

5. The method according to claim 1 wherein said second-generation colloid comprises a material selected from the group consisting of cadmium sulfide and silver chloride.

6. The method according to claim 1 wherein said second-generation colloid comprises a metal.

7. The method according to claim 1 wherein said second-generation colloid comprises a material selected from the group consisting of nickel and gold.

8. The method according to claim 1 wherein said second-generation colloid comprises a polymer.

9. The method according to claim 1 wherein said second-generation colloid comprises a material selected from the group consisting of poly(p-phenylene vinylene) and polypyrrole.

10. The method according to claim 1 wherein said porous polymer comprises a material selected from the group consisting of poly(methyl methacrylate) and polystyrene.

11. The method according to claim 1 wherein said second-generation colloid comprises oblate particles.

12. The method according to claim 1 wherein said colloidal template is an ordered, monodisperse colloid; said porous polymer is an ordered, monodisperse macroporous polymer; and said second-generation colloid is an ordered, monodisperse colloid.

13. The method according to claim 12 wherein said second-generation colloid comprises a ceramic material.

14. The method according to claim 12 wherein said second-generation colloid comprises a material selected from the group consisting of alumina, titania and zirconia.

15. The method according to claim 12 wherein said second-generation colloid comprises an inorganic salt.

16. The method according to claim 12 wherein said second-generation colloid comprises a material selected from the group consisting of cadmium sulfide and silver chloride.

17. The method according to claim 12 wherein said second-generation colloid comprises a metal.

18. The method according to claim 12 wherein said second-generation colloid comprises a material selected from the group consisting of nickel and gold.

19. The method according to claim 12 wherein said second-generation colloid comprises a polymer.

20. The methods according to claim 12 wherein said second-generation colloid comprises a material selected from the group consisting of poly(p-phenylene vinylene) and polypyrrole.

21. The method according to claim 12 wherein said porous polymer comprises a material selected from the group consisting of poly(methyl methacrylate) and polystyrene.

22. The method according to claim 12 wherein said second-generation colloid comprises oblate particles.

* * * * *